UNITED STATES PATENT OFFICE.

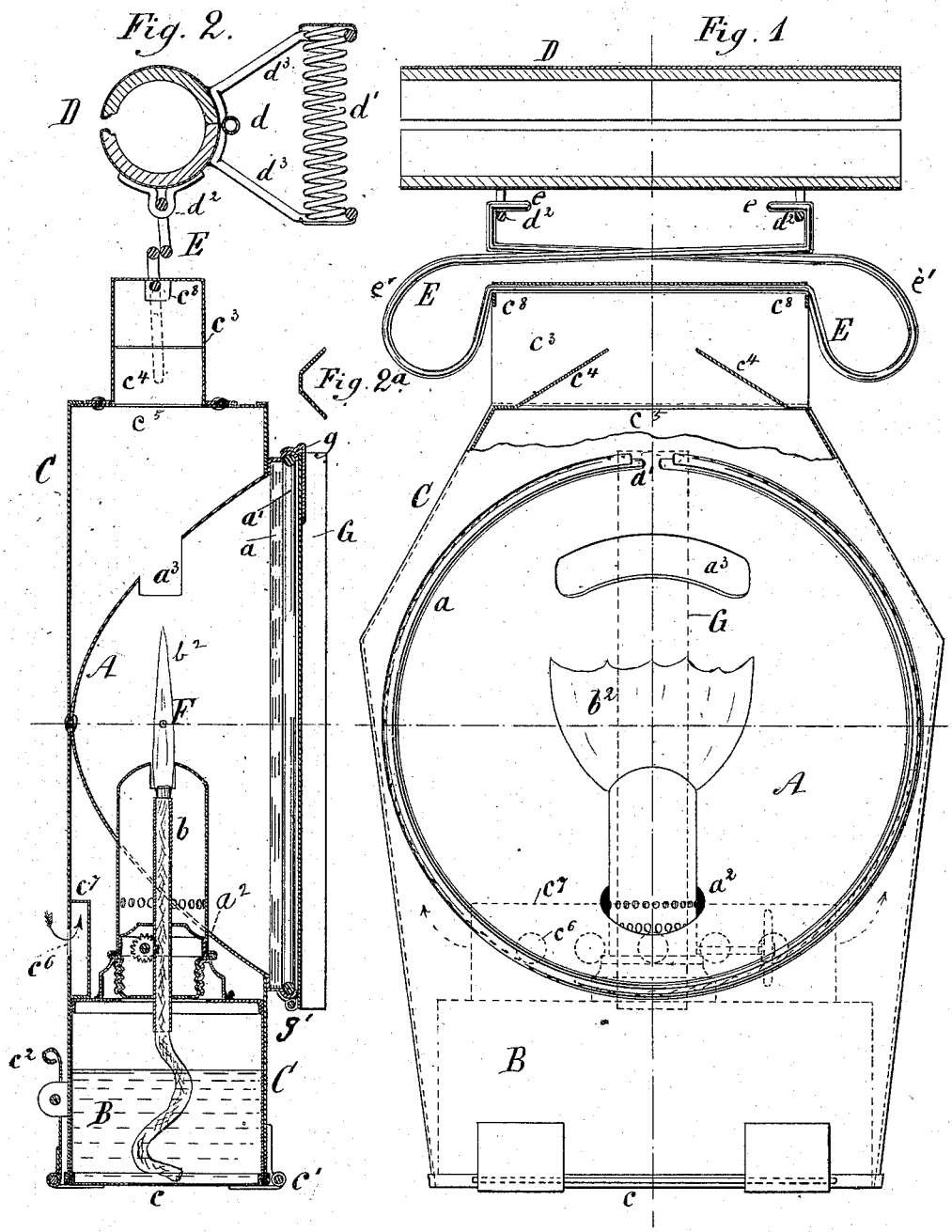

THOMAS S. MILLER, OF CHICAGO, ILLINOIS.

HUB-LAMP FOR BICYCLES OR OTHER VEHICLES HAVING SPIDER WHEELS.

SPECIFICATION forming part of Letters Patent No. 264,955, dated September 26, 1882.

Application filed January 27, 1882. (No model.)

*To all whom it may concern:*

Be it known that I, THOS. SPENCER MILLER, a citizen of the United States, residing at Chicago, in the county of Cook and State of Illinois, have invented a new and useful Hub-Lamp for Bicycles, of which the following is a specification.

My invention relates to improvements in hub-lamps for bicycles or other vehicles having spider wheels of which a focusing-reflector is used, forming a large part of the main body of the lamp, and is pierced by a burner, so as to allow the flame of said burner to burn in the focus of said reflector, my mechanism embodying a new and useful attachment to fit around axle of the front wheel of a bicycle to which it is applied; and the objects of my improvements are, first, to provide a lamp which may be used on a bicycle to throw a light upon the roadway immediately in front of the bicycle, so that its rider may be able to see with distinctness any obstacle that may come in his way, and also to warn approaching vehicles or persons of the presence of the bicyclist; second, to provide a reflector of sufficient size and proper shape or curvature as to throw a powerful light upon the roadway and to destroy the shadow of that portion of the felly and tire of the front wheel of any wheel-vehicle which is or may be in front of the lamp; and, third, to provide means for readily detaching the lamp from the axle or from the sleeve which is around the axle, the same mechanism or device to serve as a spring to relieve the lamp from the jar to which the bicycle is necessarily subjected. I attain these objects by the mechanism illustrated in the accompanying drawings, in which—

Figure 1 is a front elevation of the lamp and attachment, the upper portion of which is in section. Fig. 2 is a sectional side elevation of my whole device, and Fig. 2ª a cross-sectional view of the side-light reflector G. (Shown in dotted lines in Fig. 1 and in full lines in Fig. 2.) Fig. 3 is a sectional plan view of a bicycle front wheel, showing the position of my hub-lamp and the direction of the rays of light reflected from my focusing-reflector.

Similar letters refer to similar parts throughout the several views.

A represents a reflector, made of any suitable material, already or adapted to be polished and to withstand a moderately-high degree of heat and sudden jars without fractures. This reflector is made substantially ellipsoidal, but may be made of any other curve, so that when reflecting rays of light from the flame $b^2$, situated in the focus F of the reflector, said rays will focus or concentrate at the point $f$. (See Fig. 3.) In other words, this reflector is a section of a hollow ellipsoid the foci of which are the points F and $f$, for it is a well-known law in optics that when a light is placed in one focus of a hollow ellipsoid the rays of light will be reflected or concentrated at the other focus; and it will therefore be seen that by using a small section of this ellipsoid as a reflector and placing a light in the focus nearest this section the rays will all be reflected or concentrated at the other focus; and if an object be placed between these points (which in a spider wheel is the felly or tire) the shadow of this object will disappear or be rendered void at the same point where the rays of light are concentrated or focused, as is fully illustrated in Fig. 3.

The glass disk $a$ is fitted into a recess of the reflector, as shown in Fig. 2, and is held in its position by an annular wire spring, $a'$, fitting into a recess of appropriate size and form. The glass disk is readily removed to allow cleaning of the reflector by first removing the wire spring, which is done by inserting the thumb-nail under any side of the wire and springing the wire toward the center of the circle that it in its shape forms. The hole $a^2$ is cut through the reflector at such a position that the burner $b$ may produce its flame in the focus F. Extending vertically down and in front of the glass disk $a$ is a side light reflector, G, a cross section of which is shown in Fig. 2ª, which reflector G is hinged at $g'$, and provided at its upper end with a catch, $g$, which hooks upon the upper edge of the reflector A to hold the side reflector in its operative position. This side reflector is made of polished sheet metal stamped into shape, (represented by Fig. 2ª,) and is designed to reflect rays of light sidewise, or, in other words, at right angles to the rays reflected from the principal reflector, and thus operate as a substitute for the ordinary side-lights, which are merely openings in the side of the case closed with glass; but while my side reflector is a useful auxiliary to the lamp, it is not absolutely necessary for the successful operation of my lamp.

B is an oil-box, rectangular in all sections, parallel to any side, of sufficient capacity to hold oil enough for four or five hours' burning. The burner $b$ is an ordinary kerosene-burner, with the wick-tube and hood of sufficient length to allow the flame from the wick to burn in the focus F of the reflector. A plain straight wick-tube may be inserted in place of the one shown in case sperm-oil is to be used.

The case C is made of brass, tin, or other suitable material, having in shape, first, a height equal to the added measures of the height of oil-box B, glass disk $a$, and an extra half-inch for spare room; second, in depth equal to the depth of the reflector; and, third, in width equal to the large diameter of the reflector. The shape shown in the drawings is the preferable one, for the reason that the sides follow the direction of the spokes of the wheel to which it is applied. The case C is provided with a swinging bottom, $c$, hinged at $c'$, to allow, when open, the passage of the oil-box B. When closed the bottom $c$ is fastened with a fastening, $c^2$. The top of the case C is provided with a hood, $c^3$, riveted into its place, and is bent or formed into the shape indicated in the drawings. The opening for ventilation is at the side of the lamp. The top of the case C is cut in such a manner that the lips $c^4$ may be turned up, as shown in Fig. 1, being in width equal to the space between the sides of the hood, and also fitting the same. I depend upon the natural stiffness of the material used in the construction of the case to keep the pieces or lips $c^4$ in their proper position. These pieces or lips, turned in this way, serve to deflect the wind and prevent it from blowing down the openings $c^5$ and $a^3$, which would extinguish the flame $b^2$. The hole $a^3$ is made in the reflector A to allow ventilation for the flame $b^2$, and cut directly above the flame and directly below the opening $c^5$. Air is admitted at the openings $c^6$ in the rear of the case C, and passes transversely the box $c^7$ before it is allowed to assist in the combustion of the oil at the flame $b^2$.

A sleeve, D, made of brass or tin and lined with felt or leather, is made to fit about the axle of the front wheel of the bicycle to which the lamp is applied, the sleeve D being provided with a hinge, $d$, to allow opening or shutting for taking off or putting the sleeve onto the axle. A coil-spring, $d'$, between the arms $d^3$, is of sufficient strength or stiffness to hold said sleeve closed over the axle, and by pressing the spring together with the thumb and forefinger the whole lamp is readily detached from the axle. The sleeve D is also provided with eyelets $d^2$, fastened on the bottom of the sleeve, as shown in the drawings.

E is a wire spring running through the hood $c^3$ and through the ears $c^8$ to prevent side motion, and bent in the shape indicated in Fig. 1, the ends of the spring E being turned at right angles $e$ to fit or pass through the eyelets $d^2$, and it will be seen that with the wire bent in the form indicated in Fig. 1 it will serve as a spring for the lamp to prevent the jarring to which the bicycle is necessarily subjected. By pressing the spring E together at the points $e'$ with the thumb and fore or middle finger of one hand the whole lamp and spring will be instantly detached from the sleeve.

I am well aware of the fact that hub-lamps now in use depend more upon the size of the flame produced than upon the character of the reflector used. I invented this device to utilize the maximum reflecting-power, and also to reflect the rays of light only where they are needed; and in my experiments I decided that a focusing-reflector was preferable to a parabolic, for this reason, the parabolic reflector made the rim of the wheel cast a long black shadow immediately in front of the rider, while my focusing-reflector (with the focusing-point a little beyond the rim of the wheel, Fig. 3,) cast a shadow which came to a point the same distance from the rim as the focus $f$, Fig. 3. This shadow is of no consequence to the rider on a dark night.

What I claim as new, and desire to secure by Letters Patent, is—

1. The combination, with the spider-wheel of a bicycle or other vehicle, of a hub-lamp having a focusing-reflector, substantially as described.

2. The combination of a hub-lamp with the spring E, serving to attach and detach the lamp from the sleeve D, substantially as described.

3. The combination, with a hub-lamp and with a detachable sleeve, of a spring and the arms $d^3$ $d^3$, substantially as described.

4. The combination of the sleeve D with the spring E, substantially as described.

5. The combination of a bicycle with the sleeve D and the coil-spring, substantially as described.

6. A hub-lamp consisting of a case, C, the focusing-reflector A, secured to the front plate of the case, and provided with a glass disk, $a$, held in position by the annular spring $a'$, the hood $c^3$, and an oil-box, B, which is inserted from below into the case C, and secured in position by the hinged cover $c$, forming the bottom of the case, all substantially as described.

7. In a hub-lamp, the combination, with the focusing-reflector and with the glass disk $a$, of the hinged reflector G, vertically arranged in front of the glass disk, and adapted to reflect a portion of the rays laterally of the lamp and the general direction of the rays from the focusing-reflector, all substantially as described and shown.

THOS. SPENCER MILLER.

Witnesses:
JACOB LORUM,
WILLIAM HENRY COEN.